United States Patent
Fickenwirth et al.

[15] 3,700,297
[45] Oct. 24, 1972

[54] FLEXIBLE OSCILLATORY MOTION BEARING SEAL

[72] Inventors: Frederick I. Fickenwirth, Seattle; Jan W. Van Wyk, Kirkland, both of Wash.

[73] Assignee: The United States of America as represented by the Administrator of the Federal Aviation Administration

[22] Filed: Nov. 24, 1969

[21] Appl. No.: 879,474

[52] U.S. Cl. ........................... 308/187.2, 74/18.1
[51] Int. Cl. ........................... F16c 33/78, F16j 15/50
[58] Field of Search ......... 308/187.1, 187.2; 277/88; 138/121; 92/104, 93, 97, 34; 74/18, 18.1, 18.2; 287/88; 192/88 A

[56] References Cited

UNITED STATES PATENTS

| | | |
|---|---|---|
| 3,369,411 | 2/1968 | Hines ........................... 92/34 |
| 1,959,259 | 5/1934 | Zerk ........................... 74/18.1 |
| 3,139,115 | 6/1964 | Bawcom et al. ........... 138/121 |
| 3,416,379 | 12/1968 | Robbins ........................ 74/18.1 |

Primary Examiner—Martin P. Schwadron
Assistant Examiner—Barry Grossman
Attorney—Glenn Orlob, Kenneth W. Thomas and Bernard A. Donahue

[57] ABSTRACT

An antifriction bearing assembly and seal installation for oscillatory motion about a longitudinal axis comprising a pair of longitudinally spaced, thin-walled elastomeric seals defining a hermetically sealed chamber which contains fluid lubricant. The seal comprises an intermediate portion having a plurality of bellows-like folds which have a pair of parallel straight portions concentric with the axis of rotation and interconnected at one end by a radially directed semicircular segment.

9 Claims, 5 Drawing Figures

Patented Oct. 24, 1972

3,700,297

INVENTORS:
FREDERICK I. FICKENWIRTH
JAN W. VAN WYK
BY
Bernard A Donahue
ATTORNEY

3,700,297

FLEXIBLE OSCILLATORY MOTION BEARING SEAL

The invention described and claimed herein resulted in part from work done under United States Government Contract FA-SS-67-3, and the United States Government has an irrevocable, nonexclusive license to practice and have practiced the invention claimed herein, including the unlimited right to sublicense others to practice and have practiced the claimed invention for any purpose whatsoever.

BACKGROUND OF THE INVENTION

This invention relates to antifriction bearing assemblies; and, more particularly, to a hermetic seal assembly for containing lubricant within an oscillatory motion bearing.

In many antifriction bearing installations, full rotary motion is not required. For example, rotatably mounted aircraft control surfaces usually move less than 60° in either direction from a neutral position. Bearings used in such installations are known as oscillatory motion bearings. Traditionally, greases or solid lubricants have been used to lubricate such bearings, with contact pressure lip seals protecting the joint from large particles of extraneous matter. These lip seals normally involve a rubbing contact between seal portions which are attached to each of the inner and outer races of the bearing assembly. They are, of course, subject to wear and will not prevent the entrance of air or atmospheric contaminants. Such grease seal bearings characteristically develop a fretting wear problem caused by grease forced from the contacting surfaces where it is needed into a ridge at each end of the oscillatory travel of individual ball or roller elements.

Oil has long been recognized as a superior lubricant to grease because of its uniform spreading properties. However, oil must be isolated from the atmosphere to prevent leakage and chemical breakdown in the presence of oxygen. Attempts by the inventors to provide an airtight or hermetic seal for an oscillatory motion bearing have in the past resulted in leakage-prone units with unsatisfactory wear lifetime, and unduly high resistance to motion by the seal. Torsional resistance is, of course, highly undesirable in an antifriction bearing, and a fatigue failure of a seal which contains fluid lubricant can have critical consequences; as, for example, in an aircraft control surface application.

Accordingly, it is an object of this invention to provide an oscillating antifriction bearing with a seal assembly capable of retaining lubricating fluids within the bearing while excluding corrosion and wear-causing media, for an extended operating lifetime.

A related object is to provide a seal assembly of the type described in which torsional resistance to bearing motion is held to an absolute minimum.

A further object is to provide a seal of the type described which will allow repeated oscillatory motion of less than approximately 60° in each direction from a neutral position, for an extended operating lifetime.

A further and related object of this invention is to provide a fluid lubricant seal assembly capable of reliable functioning under the variety of temperature and pressure conditions encountered in aircraft service.

The above objectives have been achieved in this invention by the provision of a flexible hermetic seal constructed of a very thin uniform thickness, or uniformly varying thickness, elastomeric material which is preformed into a particular bellowslike configuration.

The elastomeric seal here disclosed will elastically deform to allow the required amount of oscillatory bearing motion while serving as a reliable container for a fluid lubricant maintained in a hermetically sealed condition. Stress levels within the seal material are held to a minimum for the required motion. Therefore, torsional resistance to motion as well as cycling fatigue are correspondingly minimized.

DESCRIPTION OF THE PREFERRED EMBODIMENT

Figure 1:
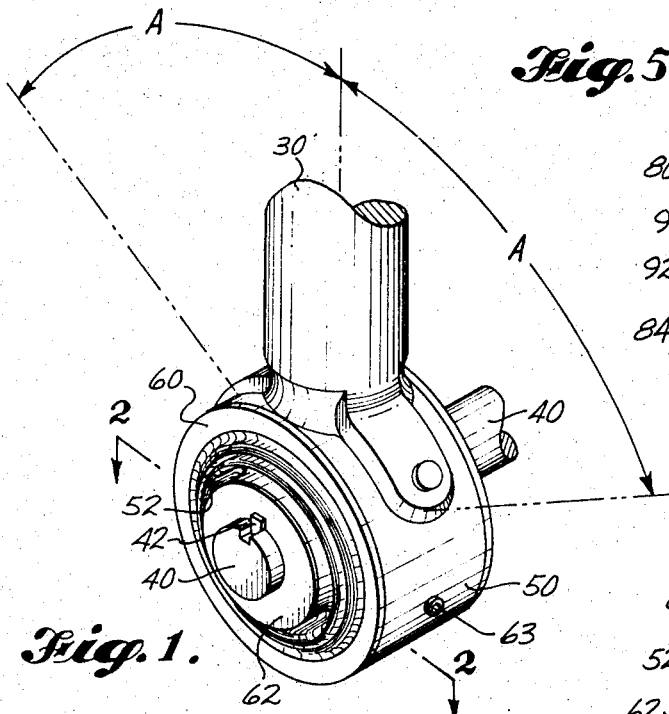
FIG. 1 is an isometric view of the exterior of a hermetically sealed bearing assembly arranged for repeated oscillatory motion.

The FIG. 1 exterior view depicts a typical oscillatory motion installation wherein a rod end 30 is arranged for relatively frictionless oscillatory motion on a center shaft 40 which is rigidly affixed to the inner race of a bearing assembly by means of a key 42. In operation, the rod end 30 is required to move angularly through the angle A from its neutral position as shown. For most installations, the angular displacement A is less than 60°. The rod end 30 is rigidly affixed, by means of integral construction or bolted connection, to the outer race 50 of an antifriction bearing. A seal 52 of a type to be described is shown to be affixed to the bearing assembly by means of a retainer ring 60 to the outer race 50, and a retainer ring 62 to the inner race of the bearing. As will later become apparent, the seal 52 provides a hermetically sealed chamber for holding lubricating fluid for the bearing contact element. Accordingly, a fluid entry port 63 is provided for filling and emptying the chamber.

Figure 2:
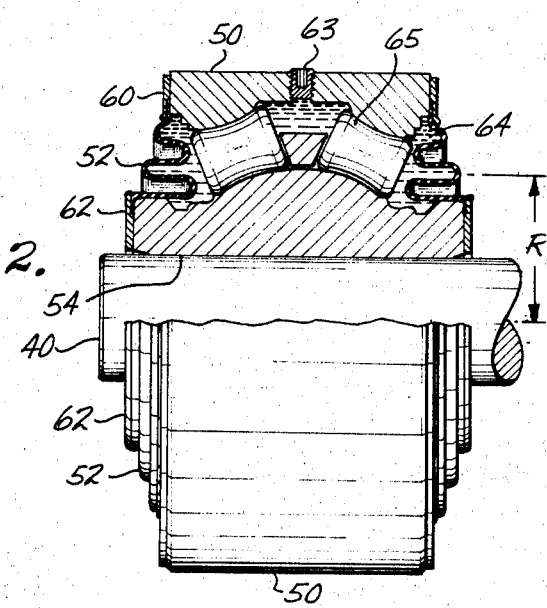
FIG. 2 is a cross-sectional view of a roller bearing assembly containing a fluid lubricant.

FIG. 2 is a cross-sectional view of the bearing assembly taken along lines 2—2 in FIG. 1. The particular bearing shown here is a concave roller type with a centering cage. The port 63 has been utilized to fill the bearing interior with fluid lubricant 64, thereby encompassing contact surfaces of the roller bearings 65. The elastomeric seal 52 serves to define a hermetically sealed chamber between outer race 50 and inner race 54. The retainer ring 60 is rigidly affixed to both the seal 52 and the outer race 50 by well known means such as bonding. In a like manner, retainer ring 62 attaches the seal 52 rigidly to inner race 54.

Since the seal 52 is rigidly affixed to each of the inner and outer races of the bearing, it is apparent that as the rod end 30 oscillates angularly, the seal must deform in a manner dictated by the transfer of torsional shear loads through the seal material. The circumferential length of the seal 52 increases with an increase in the radial distance R measured from the center of shaft 40. Accordingly, for any given angular displacement of the bearing assembly, the shear load to be carried by the seal per inch of circumferential length decreases with an increase in the radial distance R.

In the FIG. 2 cross-sectional view, it can be seen that the preferred embodiment of the seal 52 includes a radially directed inner portion which is attached to retainer plate 62, and an intermediate portion comprising a plurality of bellowslike folds. Each of the folds has a pair of straight portions which extend in a longitudinal direction and are concentrically aligned with respect to the longitudinal axis of the shaft 40. An outer radially directed portion is affixed to retainer plate 60. Seal assemblies of this type are capable of retaining lubricating fluid in a bearing assembly in a hermetically sealed condition for extended lifetimes of oscillatory motion under adverse temperature and pressure conditions.

Figure 3:
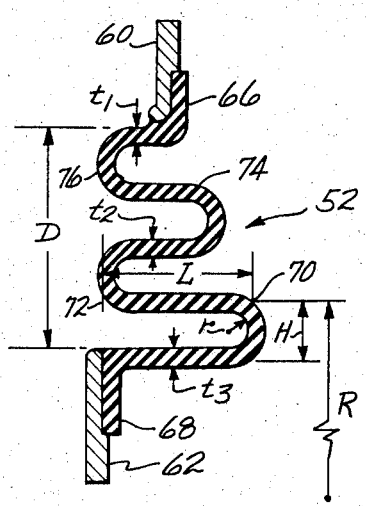
FIG. 3 is an isolated cross-sectional view of the seal assembly used in FIG. 2.

FIG. 3 provides a cross-sectional showing of the seal assembly 52 prior to its installation on the race members of the bearing. The seal 52 is preferably constructed of an elastomeric material which can be molded under heat and pressure integrally with the outer retainer plate 60 and the inner retainer plate 62. A bonding operation using an appropriate adhesive can be carried out concurrently with the molding process to attach the seal surfaces to the retainer plates.

Figure 4:
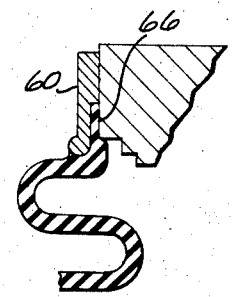
FIG. 4 is an isolated view showing the attachment of the seal to a race member.

Because of the reduction in shear loading per inch of circumference with an increase in the radius R, the preferred embodiment shown in FIG. 4 has a thickness which varies with R. The thickness $t_1$ near the outer radial portion 66, is therefore less than the thickness $t_2$ in the center of the intermediate portion, which in turn is less than the thickness $t_3$ near the inner radial portion 68. In theory, for optimum stress distribution, the relative thicknesses $t_1$, $t_2$, $t_3$ would vary inversely with their respective radial distances R from the center of rotation. However, practical considerations such as construction of the molding dies may require that this distribution vary somewhat from the ideal.

Since maximum elastic deformation with minimum load is achieved when the load transfer path is maximized, the length L of the straight portions of the bellowslike folds is a maximum considering the particular shape of the bearing assembly involved and the rigidity required to contain the fluid lubricant. The straight portions of the bellowslike folds are interconnected with generally radially directed segments 70, 72, 74, and 76. These radial segments are shaped into a semicircular section with a radius r. The radius r is preferably set at twice the thickness of the curved segment 70 so as to obtain the semicircular shape and allow a maximum number of folds per seal assembly, thereby maximizing the load path for torsional shear transfer and thereby minimizing the load required to deform the seal to a given angular displacement. Accordingly, the height H of each of the bellowslike folds or convolutions is preferably set at three times the local thickness of the seal.

In the designs of a seal for a particular bearing assembly, The dimension D between outer and inner retainer plates approximates the distance between the inner and outer races of the bearing, and therefore is of interest in defining relative geometrical parameters.

For optimum performance it has been found desirable to utilize an elastomeric material thickness for the seal which ranges from approximately 1 to 5 percent of the distance D. Likewise, the distance L is preferably within a range from 30 to 60 percent of the dimension D, as a compromise between seal flexibility, bearing geometry, and other factors.

FIG. 4 provides a detailed showing of the attachment of retainer plate 60 and seal 52 to the outer raceway 50 of the bearing assembly of FIG. 2. It can be seen that the outer radial portion 66 of the seal has been compressed to provide positive sealing characteristics. The retainer plate 60 and seal portion 66 are preferably each bonded with a reliable adhesive, under heat and pressure, to rigidly affix the seal assembly to the outer race. However, simple mechanical joints, such as a bolt threaded into raceway 50, may be used to rigidly affix the seal in certain installations.

Figure 5:
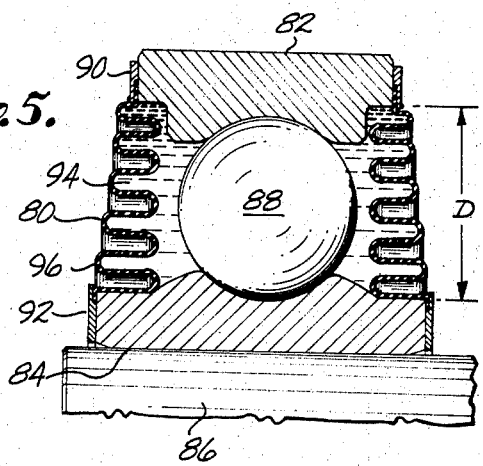
FIG. 5 is a cross-sectional view of a ball bearing assembly containing a fluid lubricant within a sealed chamber in accordance with the teachings of this disclosure.

FIG. 5 is a segmented view of a seal assembly of the type disclosed applied to another type of conventional bearing assembly; viz., a ball bearing having an outer race 82 and inner race 84 which is rigidly affixed to a center shaft 86, with a ball bearing element 88 providing for relatively frictionless motion. As in the configurations discussed previously, a lubricant fluid 94 completely encompasses the bearing contact element and is contained in a hermetically sealed cavity by the seal 80.

The seal 80 is rigidly affixed to the bearing races by means of retaining plates 90 and 92, which are similar to those previously described. The inner fold 96 of the intermediate portion of the seal 80 is preferably of a maximum length consistent with the geometry of the bearing.

In oscillatory operation, the seal members here disclosed will be stressed by torsional shear loadings to elastically deform to allow the required motion with a minimum of torsional resistance. It has also been observed that as the bearing approaches the maximum extent of its travel that many designs constructed according to this disclosure will exhibit a tendency to deform in each fold from a full circular to a polygonal modal-oriented pattern. It is presumed that this is due to the inherent instability of the ringlike radial connecting segments 76, 70, 72, and 74 (FIG. 3) with respect to the couple or kick loadings accompanying the shear load transfer through the height H to the next straight portion. This condition may be obtained or deleted as desired by variation of the design parameters discussed previously. It would appear that in some cases this modal-oriented deformation pattern may result in a decreased torsional resistance to motion by the seal without significant deleterious effect on seal operating lifetime.

In many bearing applications, it will be desirable to maintain the over-all seal and bearing assembly space envelope within the envelope normally assigned to the bearing alone. Accordingly, the intermediate bellowslike portion of the seal is preferably formed to lay inside of a plane which passes through the outermost retainer ring (60 or 62) and is perpendicular to the axis of rotation. Therefore, the longitudinal extension of the straight portions has a greater length toward the center of the chamber than away from the center. If such an envelope is observed in the basic seal design, problems of wear due to inadvertent contact with adjacent hardware are minimized.

Because of chemical interaction between fluid lubricants and elastomeric materials, it may be desirable to coat the interior of the seal with an inert material such as "Teflon". "Teflon" may also be coated on the exterior of the seal to form a low friction protective cover to prevent wear by inadvertent rubbing against adjacent structure in a crowded environment.

The preferred embodiment here disclosed has been shown to contain oil. However, it should be apparent that the disclosed hermetic seal assembly may be used to advantage to protect other fluid lubricants, such as greases, from atmospheric contaminants and to prevent inadvertent seepage to adjacent surfaces.

We claim:

1. A bearing assembly comprising: a cylindrical inner race; a cylindrical outer race mounted on bearing elements on said inner race for movement relative to said inner race angularly about the mutual longitudinal axis of each of said races; a pair of longitudinally spaced annular elastomeric seals defining a closed and hermetically sealed chamber encompassing said bearing elements; fluid lubricant contained within said chamber; wherein each of said seals comprises: an outer portion rigidly connected to said outer race for movement concurrent therewith; an inner portion rigidly connected to said inner race for movement concurrent therewith; an intermediate portion comprising a plurality of bellowslike folds wherein each of said folds has a pair of straight portions which extend in a longitudinal direction and are concentrically aligned and disposed parallel with respect to said longitudinal axis and interconnected by a radially directed segment; wherein said inner portion, said outer portion and said intermediate portion are integrally constructed of an elastomeric material to form an airtight barrier to prevent leakage of said fluid from said chamber and to prevent the entrance of atmospheric contaminants to said chamber.

2. The assembly of claim 1 wherein said intermediate portion of said elastomeric material has a thickness which ranges from approximately 1 to 5 percent of the distance between said inner and outer races.

3. The assembly of claim 2 wherein said thickness decreases with an increase in the radius measured from said longitudinal centerline.

4. The assembly of claim 2 wherein said straight portions extend longitudinally for a distance ranging from 30 to 60 percent of the distance between inner and outer races.

5. The assembly of claim 2 wherein the longitudinal extension of said straight portions has a greater length in a direction toward the center of said sealed chamber than in a direction away from said center.

6. The assembly of claim 1 wherein each of said inner and outer portions are attached to surfaces which extend substantially perpendicular to said longitudinal axis.

7. The assembly of claim 6 wherein said intermediate portion is located substantially within an envelope defined by the longitudinal location of said inner portion of each of said longitudinally-spaced elastomeric seals.

8. The assembly of claim 6 wherein said intermediate portion is located substantially within an envelope defined by the longitudinal location of said outer portion of each of said longitudinally-spaced elastomeric seals.

9. The assembly of claim 7 wherein said seals are coated with a substance which is relatively inert in the presence of fluid lubricant.

* * * * *